(12) United States Patent
Gao (10) Patent No.: US 11,691,377 B2
(45) Date of Patent: Jul. 4, 2023

(54) DECORATIVE FUNCTIONAL FILM AND ELECTRONIC DEVICE REAR COVER MODULE

(71) Applicant: SHINE OPTOELECTRONICS (KUNSHAN) CO., LTD., Kunshan (CN)

(72) Inventor: Yulong Gao, Kunshan (CN)

(73) Assignee: SHINE OPTOELECTRONICS (KUNSHAN) CO., LTD., Kunshan (CN)

( * ) Notice: Subject to any disclaimer, the term of this patent is extended or adjusted under 35 U.S.C. 154(b) by 213 days.

(21) Appl. No.: 17/043,589

(22) PCT Filed: Apr. 11, 2019

(86) PCT No.: PCT/CN2019/082292
§ 371 (c)(1),
(2) Date: Sep. 29, 2020

(87) PCT Pub. No.: WO2019/214390
PCT Pub. Date: Nov. 14, 2019

(65) Prior Publication Data
US 2021/0029233 A1 Jan. 28, 2021

(30) Foreign Application Priority Data

May 9, 2018 (CN) .......................... 201810439442.4
Jul. 2, 2018 (CN) .......................... 201810704518.1

(51) Int. Cl.
*B32B 3/30* (2006.01)
*B32B 3/26* (2006.01)
(Continued)

(52) U.S. Cl.
CPC ................ *B32B 3/30* (2013.01); *B32B 3/263* (2013.01); *B32B 7/12* (2013.01); *B32B 27/36* (2013.01);
(Continued)

(58) Field of Classification Search
CPC .. B32B 3/30; B32B 3/263; B32B 7/12; B32B 27/36; B32B 33/00; B32B 2307/416
(Continued)

(56) References Cited

U.S. PATENT DOCUMENTS

2007/0269635 A1* 11/2007 Morozumi .............. B32B 27/08
428/126
2014/0216788 A1* 8/2014 Zhou ..................... H05K 3/1258
156/212
2021/0029233 A1* 1/2021 Gao ........................ B32B 27/36

FOREIGN PATENT DOCUMENTS

CN 203502607 U 3/2014
CN 104291016 A 1/2015
(Continued)

OTHER PUBLICATIONS

International Search Report from corresponding International Application No. PCT/CN2019/082292, dated Jul. 5, 2019, 5 pages including translation.

*Primary Examiner* — Betelhem Shewareged
(74) *Attorney, Agent, or Firm* — Tucker Ellis LLP (57) ABSTRACT

Disclosed are a decorative functional film (100) and an electronic device rear cover module (300) with the decorative functional film (100). The decorative functional film (100) includes: a micro-nano layer (11) including a plurality of convex and/or concave micro-nano structures (111); a reflective layer (12) covering the micro-nano layer (11); a coloring layer (13) covering the reflective layer (12); and a functional layer (14) including a conductive layer (341). The
(Continued)

decorative functional film (100) has both decorative and functional properties.

14 Claims, 7 Drawing Sheets

(51) Int. Cl.
    *B32B 7/12*       (2006.01)
    *B32B 27/36*    (2006.01)
    *B32B 33/00*    (2006.01)
    *G02B 3/00*      (2006.01)
    *G02B 5/28*      (2006.01)
    *H04M 1/02*     (2006.01)

(52) U.S. Cl.
    CPC ........ *B32B 33/00* (2013.01); *B32B 2307/416* (2013.01); *G02B 3/0037* (2013.01); *G02B 5/28* (2013.01); *H04M 1/0283* (2013.01)

(58) Field of Classification Search
    USPC .......................................................... 428/141
    See application file for complete search history.

(56)                   References Cited

FOREIGN PATENT DOCUMENTS

| | | | | |
|---|---|---|---|---|
| CN | 107248618 A | | 10/2017 | |
| CN | 206584059 U | * | 10/2017 | ............... G02B 3/00 |
| CN | 206584059 U | | 10/2017 | |
| CN | 206684337 U | | 11/2017 | |
| CN | 207283971 U | | 4/2018 | |
| CN | 207304637 U | | 5/2018 | |
| CN | 207305171 U | | 5/2018 | |
| CN | 208828422 U | | 5/2019 | |
| JP | 2008162260 A | * | 7/2008 | ............... B44C 1/17 |

* cited by examiner

DECORATIVE FUNCTIONAL FILM AND ELECTRONIC DEVICE REAR COVER MODULE

CROSS-REFERENCE TO RELATED APPLICATIONS

The present application claims priority to Chinese Patent Application No. 201810704518.1, titled by "decorative functional film and electronic device rear cover module" and submitted to Chinese National Intellectual Property Administration on Jul. 2, 2018, and Chinese Patent Application No. 201810439442.4, titled by "decorative functional film and electronic device rear cover module" and submitted to Chinese National Intellectual Property Administration on May 9, 2018, the contents of which are incorporated herein by reference in their entireties.

TECHNICAL FIELD

The present application relates to the technical field of electronic products, and particularly to a decorative functional film and an electronic device rear cover module.

BACKGROUND

With the continuous development of electronic technology, consumer electronic products are getting closely related to daily life. For example, smart phones has become indispensable and portable companions for consumers. Consumers are also paying more and more attention to user experience. However, the existing smart phones cannot satisfy the personalized demand, as their appearance and functions tend to be similar. In this regard, differentiation in the appearance and function has become a breakthrough for smart phones. A rear cover of a smart phone is, for example, one of the important components of the smart phone, but the rear covers of the existing smart phones are all structural components with a monotonous appearance.

SUMMARY

In view of this, it is necessary to provide a decorative functional film, for solving the above technical problems.

One technical solution of the decorative functional film of the present application is described as follows.

A decorative functional film, including: a micro-nano layer comprising a plurality of convex micro-nano structures and/or a plurality of concave micro-nano structures; a reflective layer covering the micro-nano layer; a coloring layer covering the reflective layer; and a functional layer including a conductive layer.

In an embodiment, the decorative functional film further includes a carrier layer, the micro-nano layer is provided on the carrier layer, and the functional layer is provided on the coloring layer or the carrier layer.

In an embodiment, the conductive layer includes a conductive solid line or a conductive grid.

In an embodiment, the conductive solid line or the conductive grid is colorless and transparent.

In an embodiment, the functional layer further includes an insulation protective layer covering the conductive layer, and the conductive layer further includes a contact portion that is not covered by the insulation protective layer.

In an embodiment, the functional layer includes at least one of an antenna module, a display module, a touch module, a wireless charging module, an NFC module, or a light-emitting module.

In an embodiment, the display module includes at least one of an OLED display layer, an LED display layer, or a liquid crystal display layer.

In an embodiment, the decorative functional film further includes a colored layer, or the carrier layer is a colored PET layer.

In an embodiment, the decorative functional film further includes a second micro-nano layer provided at any side of the carrier layer, the micro-nano layer and the second micro-nano layer individually exhibit an optical effect, or the micro-nano layer and the second micro-nano layer interfere with each other to exhibit an optical effect.

In an embodiment, the decorative functional film further includes a graphic layer provided at any side of the carrier layer, the graphic layer is adapted to the micro-nano layer to imaging and/or the graphic layer corresponds to the functional layer.

In an embodiment, the micro-nano structures are linear cylindrical lenses, non-linear cylindrical lenses, micro lenses, small short lines, Fresnel lenses, drawing lines, CD patterns, or a combination thereof.

The present application further provides an electronic device rear cover module, including the decorative functional film described above.

The present application can bring beneficial effects as follows. The decorative functional film is provided with a micro-nano layer, a reflective layer, a coloring layer and a functional layer, having both a decorative property and a functional property.

DESCRIPTION OF EMBODIMENTS

In order to facilitate illustration of the present application, the present application will be described in more details with reference to the accompanying drawings. Preferred embodiments of the present application are illustrated in the drawings, however, it should be understood that the present application can be implemented in many different ways and is not limited to the embodiments described below. These embodiments are provided herein for comprehensively and thoroughly illustrating the present application.

Unless otherwise defined, all technical and scientific terms used herein have the same meaning as commonly understood by those skilled in the technical field of the present application. The terms used in the specification of the present application herein are merely for describing specific embodiments, and are not intended to limit the present application. The term "and/or" used herein includes any and all combinations of one or more related listed items.

The present application provides a decorative functional film, having both a decorative property and a functional property. The decorative functional film includes a micro-nano layer, and a micro-nano structure in the micro-nano layer has optical effects such as a reflective effect, a refractive effect, a transmission effect on light, thereby producing the optical effects and enhancing the decorative effect. The decorative functional film includes a functional layer, which has functions of antenna, display, touch control, wireless charging, Near Field Communication (NFC), active light emission, etc.

The present application provides an electronic device rear cover module including the decorative functional film. The electronic device rear cover module has good decorative and functional properties, satisfying the personalized demand on appearance and function. Taking a smart phone as an example, the decorative functional film is applied to a rear cover of the phone, which first adds a decorative effect to the mobile phone, producing optical effects, such as light columns, three-dimensional effects, etc., and the display of colors and patterns is sharper and clearer or more dazzling. Moreover, the functionality of the mobile phone is improved, for example, the rear cover of the mobile phone is integrated with: an antenna module, having antenna function; a display module for displaying battery status, caller ID, message display, reminder, etc.; a touch module having functions such as sliding unlocking, fingerprint unlocking, volume adjustment, page turning, turning on & turning off, etc.; a wireless charging module having charging function; an NFC module having functions of payment, clocking in and other functions; and a light-emitting module having functions such as active light emission, additional decoration or information reminder, etc.

Preferably, a decorative functional film includes a micro-nano layer, an appearance layer and a functional layer that are stacked. The stacking sequence of the micro-nano layer, the appearance layer and the functional layer is not limited herein. Each of the micro-nano layer, the appearance layer and the functional layer may be a single layer or includes multiple layers, and in a case where multiple layers are included, the multiple layers may be continuously stacked or stacked with spaces. The micro-nano layer includes a plurality of convex micro-nano structures and/or a plurality of concave micro-nano structures, and the plurality of micro-nano structures produces special optical effects on light. The appearance layer includes at least one of a reflective layer, a coloring layer, a colored layer, or a graphic layer, and is used for displaying the color and graphic of the rear cover, etc. The micro-nano layer, in cooperation with the appearance layer, enhances the display effect of the appearance layer, to be brighter, clearer, more three-dimensional, more dazzling, etc.; to form optical images, 3D images, suspended images, etc.; to form rainbow patterns, interference patterns, tiger skin pattern, CD pattern, etc.; or to form light and shadow bright patterns, including straight lines, curved lines, circular dots, cones, apertures, etc. The functional layer includes an antenna module, a display module, a touch module, a wireless charging module, an NFC module, a light-emitting module, etc., composed of electrically conductive solid lines, electrically conductive grids, light-emitting materials, display materials, etc. The functional layer can exert its functions by itself, or it can cooperate with the micro-nano layer and the appearance layer to exert its functions: graphic luminescence, graphic variations, light and shadow variations, etc. The optical effects of the micro-nano layer, the color of the appearance layer, graphics, etc. can be set corresponding to the functional layer, serving as a mark for the functional layer. For example, the appearance layer is provided with corresponding arrow marks corresponding to the touch module of the functional layer, e.g., a left-directed arrow indicates pagescrolling backwards, or a right-directed arrow indicates pagescrolling backwards. In other embodiments, the decorative functional film may include the appearance layer and the functional layer without the micro-nano layer, and the appearance layer includes at least one of the reflective layer, the coloring layer, the colored layer, or the graphic layer. For example, the appearance layer includes the graphic layer matched with the functional layer. For example, the graphic layer is in a shape of a battery, and the functional layer is a light-emitting or display module, which can correspondingly display in the graphic layer according to the battery statustext.

Specifically, a decorative functional film includes a micro-nano layer, a reflective layer, a coloring layer, and a functional layer that are stacked in sequence. The micro-nano layer includes a plurality of convex micro-nano structures and/or a plurality of concave micro-nano structures, the reflective layer covers the micro-nano structure, the coloring layer covers the reflective layer, and the functional layer is formed on the coloring layer.

Preferably, the micro-nano layer is a UV resin layer, and the micro-nano structure is a convex and/or concave structure formed by imprinting. The micro-nano structure has reflective and refractive effects on light to produce optical effects. In general, the UV resin layer is a colorless transparent layer, but it may also be a colored UV resin with a certain transmittance. The colored UV resin can perform color development on the decorative functional film in cooperation with the reflective layer and the coloring layer, or perform color development on the decorative functional film by itself. In a case where the colored UV resin performs color development on the decorative functional film by itself, the appearance layer is the micro-nano layer. The micro-nano structure may be at least one of a linear cylindrical lens, a non-linear cylindrical lens, a micro lens, a small short line, a Fresnel lens, drawing lines, a CD pattern, etc. The micro-nano structure can be arranged with spaces therebetween and/or without spaces therebetween. The micro-nano structure has a cross-sectional shape which may be a triangle, a quadrilateral, a polygon, an arc, a special shape, etc. The micro-nano structures all have the same parameters or have different parameters from each other, and these parameters include a type, a shape, a length, a width, a height, a curvature, an angle, a depth, a position, etc.

Preferably, the reflective layer is a metal or non-metal layer that is plated on the micro-nano structure layer and has a reflective effect. It can make the optical effect better, and also provide colors for the decorative functional film. The coloring layer is formed on the reflective layer and is generally a dark ink layer. The coloring layer is configured to display colors in cooperation with the reflective layer, and to block display of the functional layer at the other side.

Preferably, the functional layer is a conductive layer formed by processes such as laser printing, laser, and imprinting. The conductive layer may be a conductive solid line or a conductive grid directly arranged on the coloring layer, or the conductive layer may be a conductive solid line or a conductive grid formed by a conductive material filled in a groove imprinted on a UV resin coated on the coloring layer. The conductive solid line or the conductive grid can form an antenna, a wireless charging coil, a touch grid, an NFC grid, etc.

Preferably, the functional layer further includes an insulation protective layer covering the conductive layer, and the conductive layer further includes a contact portion that is not covered by the insulation protective layer. The contact portion is configured to be electrically connected to an external circuit.

Preferably, the functional layer is formed at a side of the micro-nano layer facing away from the reflective layer. The functional layer includes a conductive layer or a display layer. The conductive layer is a conductive solid line or a conductive grid. The conductive layer can form an antenna, a wireless charging coil, a touch grid, an NFC grid, etc. The conductive solid line or grid line of the conductive layer has a width that is outside of a range visible to human eyes, or the conductive material of the conductive layer is a transparent conductive material such as ITO, so that the conductive solid line or conductive grid is colorless and transparent. It should be noted that, the conductive layer may also be a conductive solid line or grid line visible to human eyes, and can be directly displayed outside or hidden in the graphic layer. The display layer is at least one of an OLED display layer, an LED display layer, or a liquid crystal display layer, and may be a transparent layer such as an OLED display layer or may be a visible layer. In a case where it is a visual layer, it occupies a local part of the decorative functional film.

Preferably, the decorative functional film further includes a second micro-nano layer arranged at a side of the micro-nano layer facing away from the reflective layer. The micro-nano layer and the second micro-nano layer may individually form a respective optical effect, or the micro-nano layer and the second micro-nano layer may interfere with each other to form an optical effect. The decorative functional film further includes a graphic layer arranged at a side of the micro-nano layer facing away from the reflective layer. The graphic layer may be formed by a filler filled after imprinting. The graphic layer is adapted to the micro-nano layer to imaging and/or the graphic layer corresponds to the functional layer.

Preferably, the decorative functional film further includes a carrier layer arranged at a side of the micro-nano layer facing away from the reflective layer, and the carrier layer is a PET layer, a PC layer, a PI layer, etc. The carrier layer is coated with UV resin, which is imprinted and cured to form a micro-nano layer. A adhesive layer may be provided at a side of the carrier layer facing away from the micro-nano layer, and the adhesive layer is configured to bond the decorative functional film to a base material such as glass, thereby forming an electronic device rear cover module. The side of the carrier layer facing away from the micro-nano layer may be further provided with at least one of a second micro-nano layer, a graphic layer, or a colored layer.

For example, a decorative functional film includes a micro-nano layer, a reflective layer, and a functional layer that are stacked in sequence. The micro-nano layer includes a plurality of convex micro-nano structures and/or a plurality of concave micro-nano structures, the reflective layer is provided on the micro-nano structure, and the functional layer is formed on the reflective layer. In this case, the reflective layer has functions such as reflection, color development and blocking.

Specifically, a decorative functional film includes an adhesive layer, a carrier layer, a micro-nano layer, a reflective layer, a coloring layer, and a functional layer that are stacked in sequence.

Preferably, the functional layer includes a conductive layer, and the conductive layer includes a conductive grid and a leading wire extending from the conductive grid. A UV resin is imprinted to form intercommunicated grooves, and then a conductive material is filled in the grooves to form the conductive grid.

Specifically, a decorative functional film includes a second micro-nano layer or a graphic layer or a colored layer, a carrier layer, a micro-nano layer, a reflective layer, a coloring layer, and a functional layer that are stacked in sequence.

Preferably, the functional layer includes a conductive layer, and the conductive layer includes a conductive grid and a leading wire extending from the conductive grid. A UV resin is imprinted to form intercommunicated grooves, and then a conductive material is filled in the grooves to form the conductive grid.

Specifically, a decorative functional film includes a functional layer, a carrier layer, a micro-nano layer, a reflective layer, and a coloring layer that are stacked in sequence.

Preferably, the functional layer includes a conductive layer, and the conductive layer includes a conductive grid and a leading wire extending from the conductive grid. A UV resin is imprinted to form intercommunicated grooves, and then a conductive material is filled in the grooves to form the conductive grid.

Specifically, a decorative functional film includes a carrier layer, a functional layer, a micro-nano layer, a reflective layer, and a coloring layer that are stacked in sequence.

Preferably, the functional layer includes a conductive layer, and the conductive layer includes a conductive grid and a leading wiring extending from the conductive grid. A UV resin is imprinted to form intercommunicated grooves, and then a conductive material is filled in the grooves to form the conductive grid.

Specifically, a decorative functional film includes a micro-nano layer, a carrier layer, a reflective layer, a coloring layer, and a functional layer that are stacked in sequence.

Preferably, the functional layer includes a conductive layer, and the conductive layer includes a conductive grid and a leading wiring extending from the conductive grid. A UV resin is imprinted to form intercommunicated grooves, and then a conductive material is filled in the grooves to form the conductive grid.

In summary, several layers of the adhesive layer, the carrier layer, the micro-nano layer, the colored layer, the reflective layer, the coloring layer, the conductive layer, the display layer, the insulation protective layer, etc., can be combined as required to form the decorative functional film of the present application, which has both a decorative property and a functional property.

The present application further provides an electronic device rear cover module including the above-mentioned decorative functional film. The electronic device rear cover module adopts a base material such glass, plastic, metal etc., while the decorative functional film is adhered or directly formed on the base material. When the electronic device rear cover module includes the decorative functional film, it is not only a structural component. In addition to a better decorative property, it also has a certain functional property to meet personalized requirements. Taking smart phones as an example, the design of the micro-nano layer and the appearance layer differentiates the appearance design of the rear cover of the mobile phone from the conventional ones, and provides a very good decorative effect. Moreover, the rear cover of the mobile phone is integrated with a functional module, and some functions of the mobile phone, such as turning on/off, pagescrolling, volume adjustment, battery status, caller identification, wireless charging, NFC, active light emission, etc. can be set on the rear cover module. The functional layer is stacked on the micro-nano layer and the appearance layer, which basically does not increase a thickness of the rear cover of the mobile phone, but has certain functions, and cooperates with the micro-nano structures, colors, graphics and texts, etc. to achieve the best customer experience, so that the mobile phone not only is a structural component, but has both a decorative property and a functional property. For the functional module of the functional layer, a main structure is the conductive layer. The conductive layer is arranged at a side of the coloring layer facing away from the micro-nano layer and the reflective layer, and thus will not affect the appearance at all. For example, the conductive grid of the conductive layer forms an antenna. When the antenna is set in the coloring layer, it is absolutely invisible from the outside, that is, a conventional three-section shell can be discarded. The conductive layer may be arranged at one or both sides of the carrier layer, and the conductive layer is visible or invisible to human eyes. When being visible, it can directly exhibit or be designed into a certain pattern, for example, the conductive solid line of the conductive layer is arranged along the logo of the mobile phone; when being invisible, it may adopt transparent conductive materials such as ITO, or the conductive layer can cooperate with the micro-nano layer and/or the graphic layer to achieve being hidden. The leading wire of the conductive layer can extend to the inside through an edge of the rear cover, a local blind hole, or a camera hole to facilitate electrical connection with components such as batteries.

Specifically, an electronic device rear cover module includes: a substrate, a micro-nano layer, a reflective layer, a coloring layer, and a conductive layer. Preferably, the substrate, the micro-nano layer, the reflective layer, the coloring layer, and the conductive layer are stacked in sequence. Preferably, a bonding layer is provided between the coloring layer and the conductive layer. The conductive layer includes a conductive solid line or a conductive grid, and the conductive solid line or the conductive grid has a contact portion or a leading wire.

Specifically, an electronic device rear cover module includes: a substrate, an adhesive layer, a carrier layer, a micro-nano layer, a reflective layer, a coloring layer, and a conductive layer. Preferably, the substrate, the adhesive layer, the carrier layer, the micro-nano layer, the reflective layer, the coloring layer, and the conductive layer are stacked in sequence. Preferably, a bonding layer is provided between the coloring layer and the conductive layer. The conductive layer includes a conductive solid line or a conductive grid, and the conductive solid line or the conductive grid has a contact portion or a leading wire.

Specifically, an electronic device rear cover module includes a substrate, an adhesive layer, a conductive layer, a carrier layer, a micro-nano layer, a reflective layer, and a coloring layer that are stacked in sequence. The conductive layer includes a conductive solid line or a conductive grid, and the conductive solid line or the conductive grid has a leading wire. The leading wire extends to a side of the coloring layer facing away from the reflective layer through an edge of the substrate or through a perforated hole.

Hereinafter, with reference to the drawings, the decorative functional film and the electronic device functional module of the present application will be described with examples.

With reference to FIG. 1 to FIG. 5, a decorative functional film 100 is described, and various implementation manners are illustrated.

Figure 1:
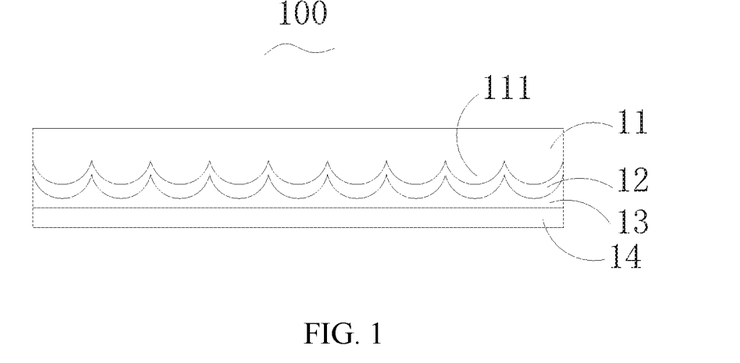
FIG. 1 is a schematic cross-sectional view of a decorative functional film according to the present application.

With reference to FIG. 1, a decorative functional film 100 includes a micro-nano layer 11, a reflective layer 12, a coloring layer 13 and a functional layer 14 that are stacked in sequence. The micro-nano layer 11 includes a plurality of convex micro-nano structures 111. In this embodiment, the micro-nano structures 111 are formed by a plurality of micro lenses arranged in a row. The reflective layer 12 is a metal layer plated on the micro-nano structures 111. The coloring layer 13 is a ground color ink layer, and the coloring layer 13 and the reflective layer 12 provide colors for the decorative functional film 100. Then the reflective layer 12 and the coloring layer 13 constitute the appearance layer of the decorative functional film 100. The functional layer 14 is a conductive layer, including a plurality of conductive grids and a leading wire electrically connected to the conductive grids, and a gold finger is exposed at an end of the leading wire. The conductive layer may be a conductive layer for antennas, touch control, wireless charging, and NFC. The functional layer 14 may include an antenna module, a touch module, a wireless charging module, or an NFC module, etc., so that the decorative functional film 100 has both a decorative property and a functional property. In other embodiments, the micro-nano layer 11 is a colored UV resin.

Figure 2:
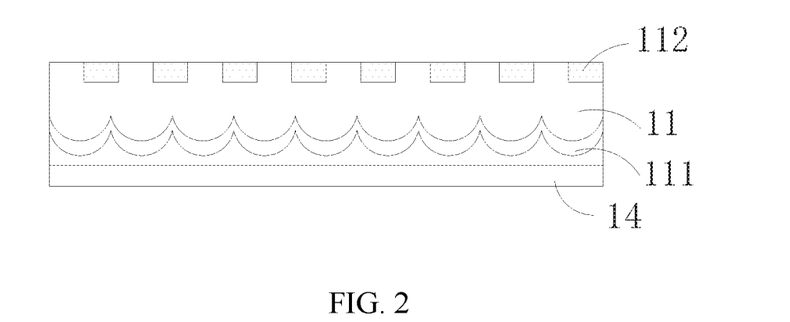
FIG. 2 is another schematic cross-sectional view of a decorative functional film according to the present application.

Preferably, with reference to FIG. 2, the micro-nano layer 11 (for convenience of description, a same type of layer of a same type of decorative functional film adopts the same reference numeral in different embodiments, and the same below) is imprinted at a side facing away from the micro-nano structure 111 and is then filled to form graphic structures 112. The graphic structures 112 may be responsible for color, indication or logo. The micro-nano structures 111 can make the graphic structure 112 brighter and clearer, and can also allow the graphic structures 112 to exhibit three-dimensional effects or allow imaging of the graphic structures 112. The graphic structures 112 can also cooperate with the functional layer 14. For example, the graphic structure 112 is "+" and "−", and the functional layer 14 has a touch function. When clicking "+", the volume is increased or the page is scrolled backwards, etc., and when clicking "−", the volume is decreased or the page is scrolled forwards, etc.

Figure 3:
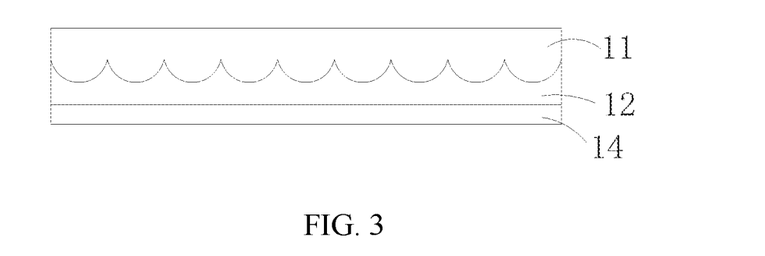
FIG. 3 is another schematic cross-sectional view of a decorative functional film according to the present application.

Preferably, with reference to FIG. 3, the decorative functional film 100 includes a micro-nano layer 11, a reflective layer 12, and a functional layer 14 that are stacked in sequence. The reflective layer 12 has a relatively large thickness, and the reflective layer 12 has both a reflective function and a ground color ink function.

Figure 4:
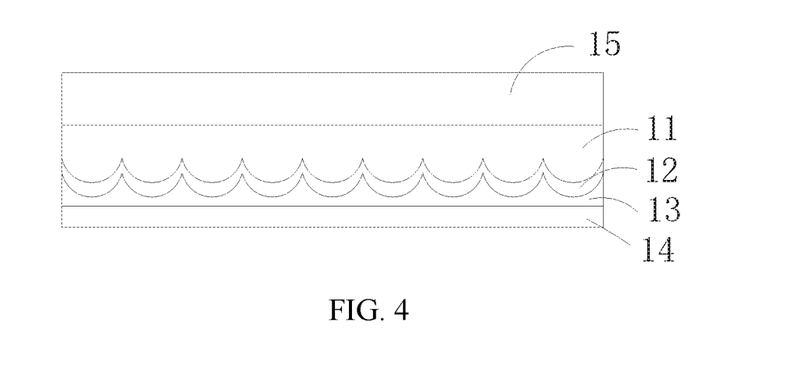
FIG. 4 is another schematic cross-sectional view of a decorative functional film according to the present application.

Preferably, with reference to FIG. 4, the decorative functional film 100 further includes a carrier layer 15. In an embodiment, the carrier layer 15 is a PET layer. The PET layer is a colored or colorless transparent layer. The carrier layer 15 serves as a base material layer and a supporting layer. The micro-nano layer 11, the reflective layer 12, the coloring layer 13 and the functional layer 14 are formed on the carrier layer 15 in sequence.

Figure 5:
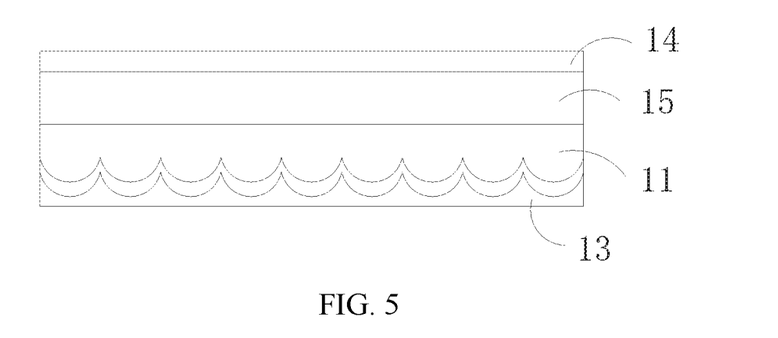
FIG. 5 is another schematic cross-sectional view of a decorative functional film according to the present application.

Preferably, with reference to FIG. 5, the functional layer 14 is arranged at a side of the carrier layer 15 facing away from the micro-nano layer 11. Since there is no blocking by the coloring layer 13, the functional layer 14 can be set as a conductive layer, and the conductive layer can be hidden under the graphics, forming a special pattern or adopting a transparent conductive material (such as ITO). The functional layer 14 may also be set as a display module and a light-emitting module. The display module is used for such as OELD display, liquid crystal display, etc., and the light-emitting module is for example used for OLED light emission or LED light emission. The functional layer 14 is electrically connected to a power source, a chip, etc. through leading wires.

With reference to FIG. 6 to FIG. 15, a decorative functional film 200 is described, and various implementation manners are illustrated.

Figure 6:
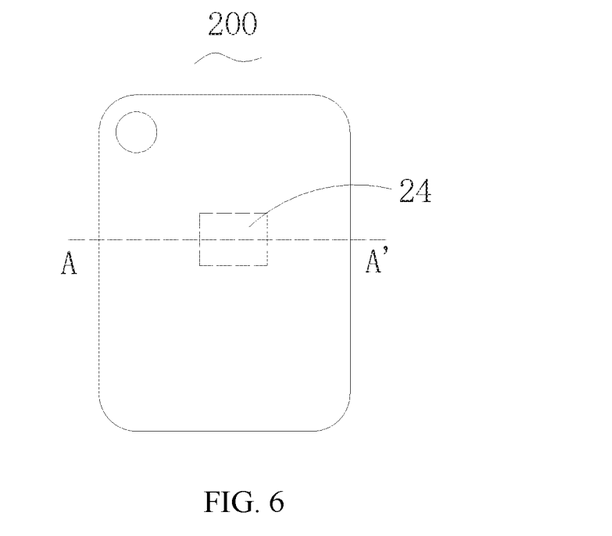
FIG. 6 is a schematic plan view of a decorative functional film according to the present application.
Figure 7:
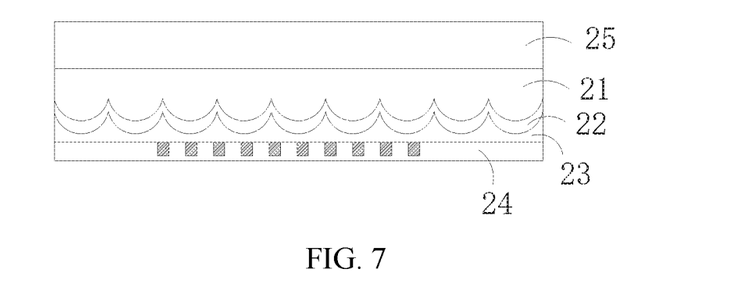
FIG. 7 is a schematic cross-sectional view along line A-A in FIG. 6.

With reference to FIG. 6 and FIG. 7, a decorative functional film 200 is sheet-like. The decorative functional film 200 includes a carrier layer 25, a micro-nano layer 21, a reflective layer 22, a coloring layer 23, and a functional layer 24 that are stacked in sequence. The functional layer 24 is displayed in a touch area for touch function on an entire film 200. The functional layer 24 includes a conductive grid printed or formed by laser onto the coloring layer 23 and an insulation protective layer covering the conductive grid. The touch function can be turning on/off, volume, pagescrolling, fingerprint recognition, etc. Moreover, the touch area can have a darker/lighter color with light spots, etc. to be distinguished from other areas.

Figure 8:
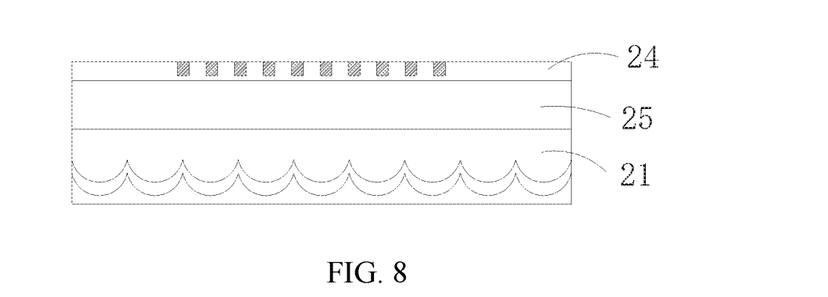
FIG. 8 is another schematic cross-sectional view of a decorative functional film shown in FIG. 7.

Preferably, with reference to FIG. 8, the functional layer 24 is arranged at a side of the carrier layer 25 facing away from the micro-nano layer 21. The conductive grid of the functional layer 24 can adopt invisible thin lines or transparent lines to exhibit a transparent state, or adopt visible solid lines to make the touch area more obvious.

Figure 9:
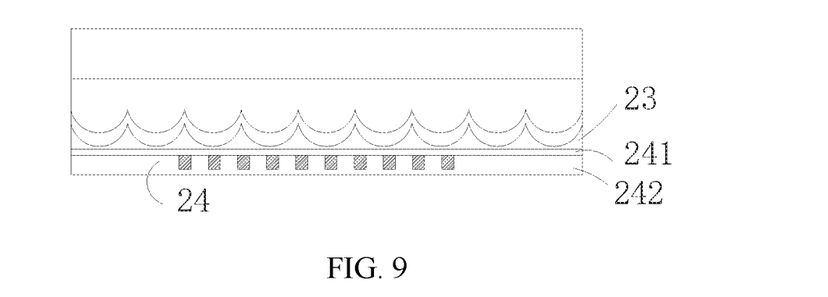
FIG. 9 is another schematic cross-sectional view of a decorative functional film shown in FIG. 7.

Preferably, with reference to FIG. 9, the functional layer 24 includes a bonding layer 241 and a conductive layer 242. The bonding layer 241 bonds the functional layer 24 to the coloring layer 23. The conductive layer 242 is formed by imprinting the UV resin to form grooves and then filling the grooves with the conductive material. Alternatively, the conductive layer 242 is formed on other base material, and then bonded through the bonding layer 241.

Figure 10:
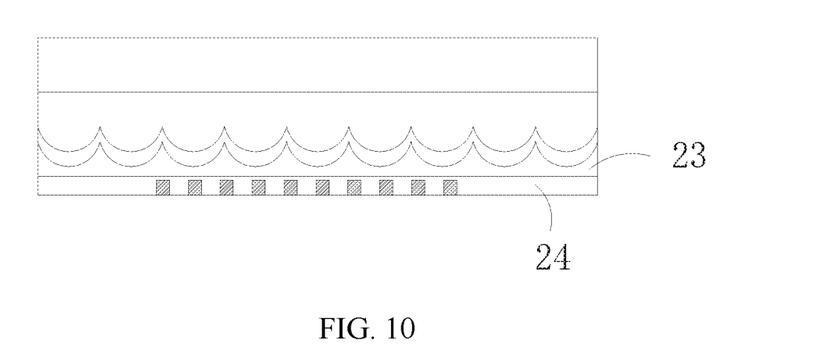
FIG. 10 is another schematic cross-sectional view of a decorative functional film shown in FIG. 7.

Preferably, with reference to FIG. 10, the functional layer 24 is formed by coating UV resin on the coloring layer 23, imprinting the UV resin to form grooves and then filling the grooves with the conductive material.

Figure 11:
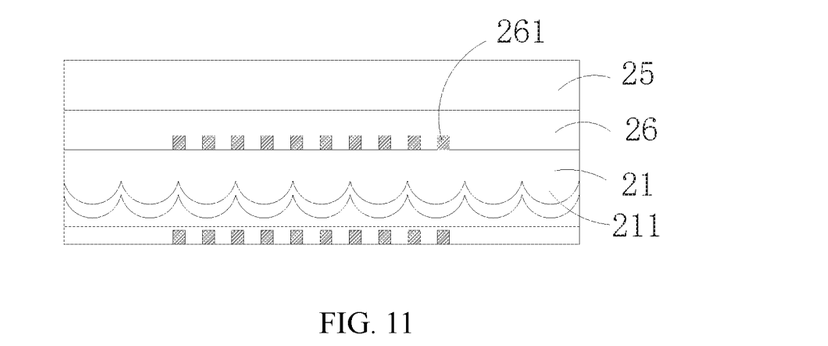
FIG. 11 is another schematic cross-sectional view of a decorative functional film shown in FIG. 7.

Preferably, with reference to FIG. 11, the functional decorative film 200 further includes a graphic layer 26 between the micro-nano layer 21 and the carrier layer 25. The graphic layer 26 can be text, logo, indicator icon, color, etc., to make the touch area more obvious. The graphic layer 26 includes graphic structures 261 formed by imprinting and then filling the UV resin. The micro-nano structures 211 can make the graphic structures 261 clearer and more obvious or exhibit 3D effects or be imaged.

Figure 12:
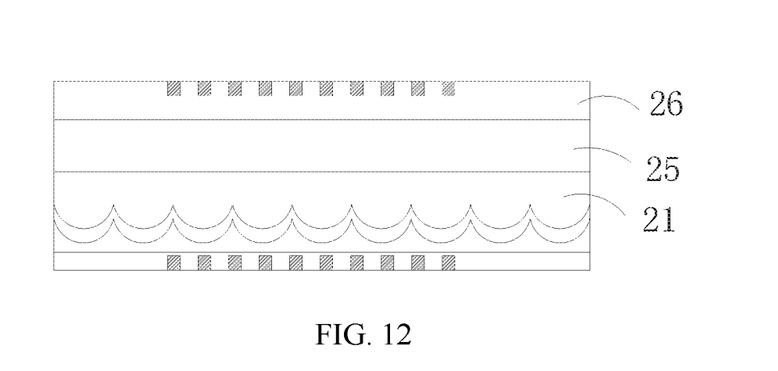
FIG. 12 is another schematic cross-sectional view of a decorative functional film shown in FIG. 7.

Preferably, with reference to FIG. 12, the graphic layer 26 is formed at a side of the carrier layer 25 facing away from the micro-nano layer 21.

Figure 13:
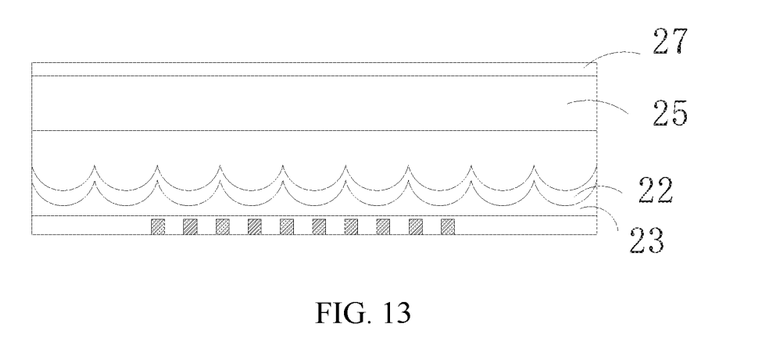
FIG. 13 is another schematic cross-sectional view of a decorative functional film shown in FIG. 7.

Preferably, with reference to FIG. 13, the functional decorative film 200 further includes a colored layer 27 provided on the carrier layer 25. The colored layer 27 can perform color development on the functional decorative film 200 by itself, or can perform color development in cooperation with the reflective layer 22 and the coloring layer 23. In other embodiments, the colored layer may be located between the carrier layer and the micro-nano layer.

Figure 14:
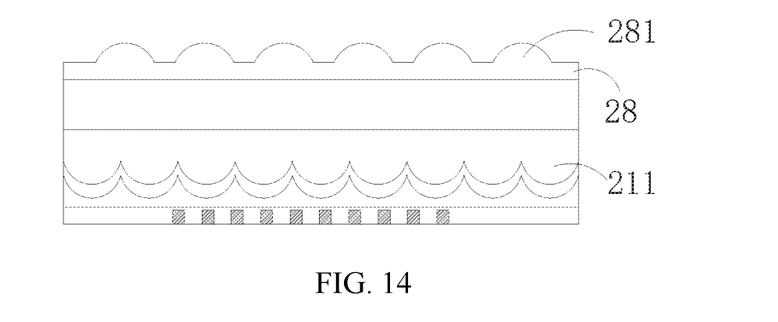
FIG. 14 is another schematic cross-sectional view of a decorative functional film shown in FIG. 7.

Preferably, with reference to FIG. 14, the functional decorative film 200 further includes a second micro-nano layer 28. The second micro-nano layer 28 includes a plurality of convex second micro-nano structures 281. The second micro-nano structures 281 are a plurality of cylindrical lenses arranged with spaces therebetween. The micro-nano structure 211 and the second micro-nano structure 281 have a respective optical effect individually, or the micro-nano structure 211 and the second micro-nano structure 281 may interfere with each other to form a new optical effect.

Figure 15:
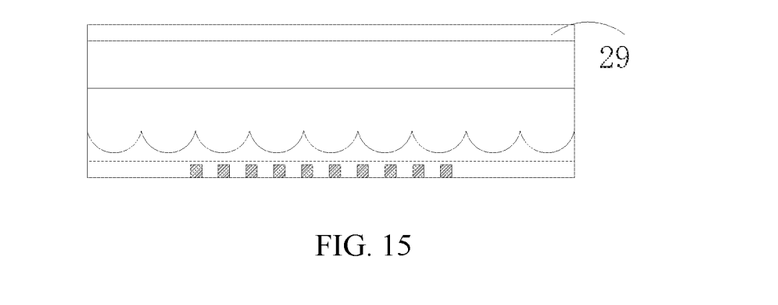
FIG. 15 is another schematic cross-sectional view of a decorative functional film shown in FIG. 7.

Preferably, with reference to FIG. 15, the functional decorative film 200 further includes an adhesive layer 29. The adhesive layer 29 may carry a release film for facilitating transportation. The adhesive layer 29 is configured to bond the functional decorative film 200 to a glass panel, etc.

With reference to FIG. 16 to FIG. 19, an electronic device rear cover module 300 is described, and various implementation manners are illustrated.

Figure 16:
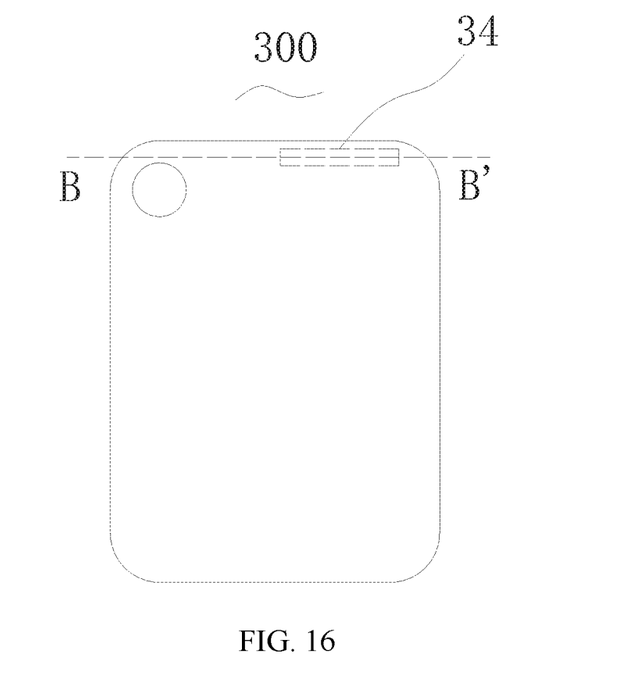
FIG. 16 is a schematic plan view of an electronic device rear cover module according to the present application.
Figure 17:
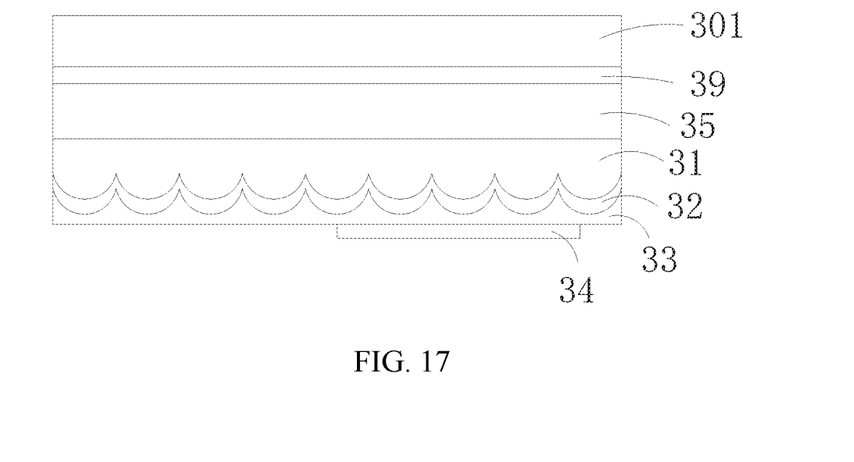
FIG. 17 is a schematic cross-sectional view along line B-B in FIG. 16.

With reference to FIG. 16 and FIG. 17, the electronic device rear cover module 300 includes a substrate 301, an adhesive layer 39, a carrier layer 35, a micro-nano layer 31, a reflective layer 32, a coloring layer 33, and a functional layer 34 in sequence. The functional layer 34 is located at an upper end of the rear cover module 300, and a conductive grid is set inside the functional layer 34 to form an antenna of the electronic device rear cover module 300. The functional layer 34 includes an antenna set at an upper end reserved position of the coloring layer 33 by printing or laser technology. The antenna may be a conductive solid line or a conductive grid. The substrate 301 is transparent glass. Taking the rear cover of a mobile phone as an example, the substrate 301 is arranged in an outer layer, the coloring layer 33 blocks the inside of the mobile phone, and the antenna is arranged at a side of the coloring layer 33 facing away from the micro-nano layer 31. Thus, the antenna can be truly hidden, providing a breakthrough improvement in the design of the rear cover of the mobile phone.

Figure 18:
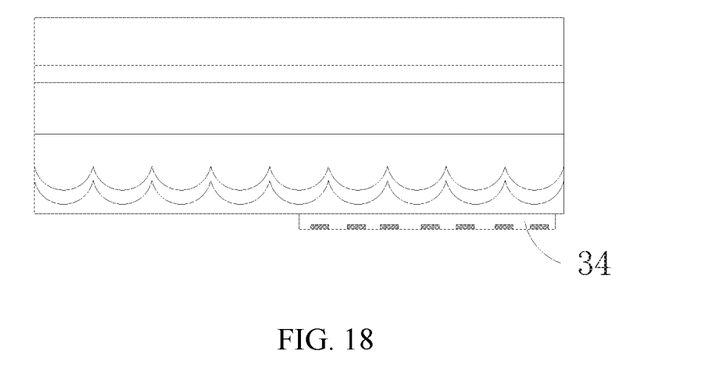
FIG. 18 is another schematic cross-sectional view of an electronic device rear cover module shown in FIG. 17.

With reference to FIG. 18, the functional layer 34 is formed by imprinting the UV resin to form grooves and then filling the grooves with a conductive material. In other embodiments, the functional layer may be arranged at one or both sides of the carrier layer, and may be filled with colored or colorless conductive material as required.

Figure 19:
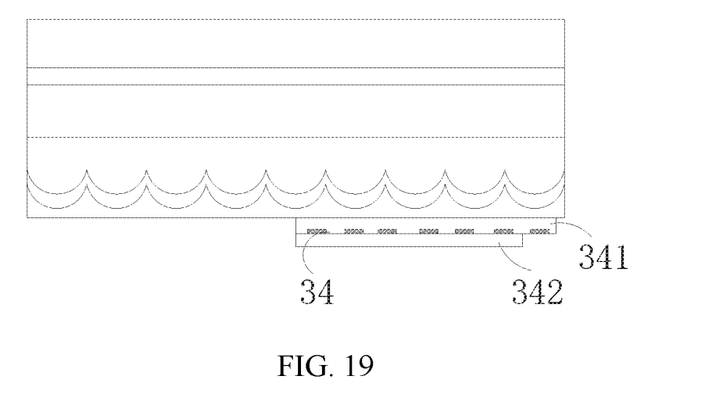
FIG. 19 is another schematic cross-sectional view of an electronic device rear cover module shown in FIG. 17.

With reference to FIG. 19, the functional layer 34 further includes a conductive layer 341 and an insulation protective layer 342 covering the conductive layer 341. The insulation protective layer 342 does not cover the contact portion of the conductive layer 341, and electrical connection with an internal structure of the mobile phone can be achieved through the contact portion.

With reference to FIG. 20 to FIG. 23, an electronic device rear cover module 400 is described, and various implementation manners are illustrated.

Figure 20:
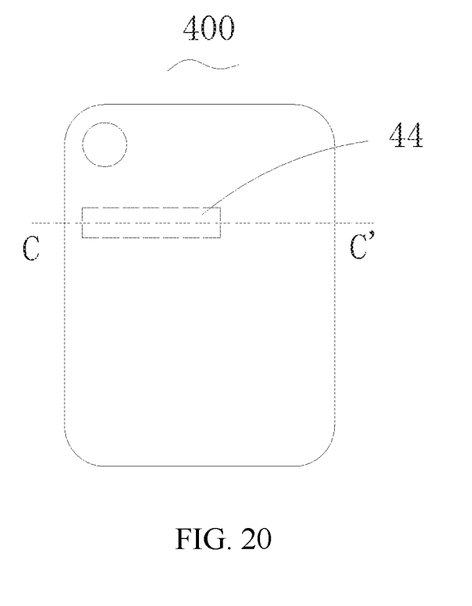
FIG. 20 is a schematic plan view of an electronic device rear cover module according to the present application.
Figure 21:
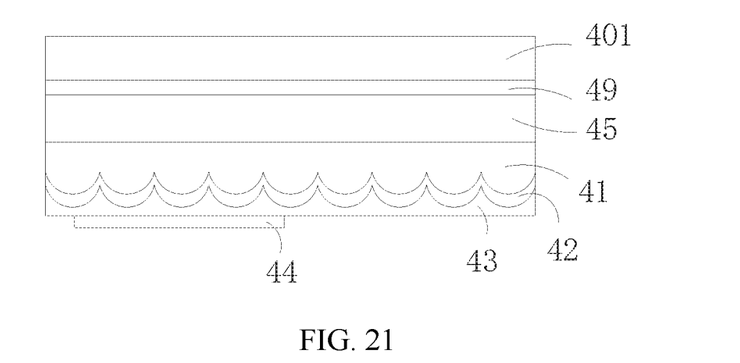
FIG. 21 is a schematic cross-sectional view along line C-C in FIG. 20.

With reference to FIG. 20 and FIG. 21, the electronic device rear cover module 400 includes a substrate 401, an adhesive layer 49, a carrier layer 45, a micro-nano layer 41, a reflective layer 42, a coloring layer 43, and a functional layer 44 in sequence. Still taking a mobile phone as an example, the functional layer 44 achieves functions such as wireless charging or NFC. For example, the functional layer 44 includes a coil at a wireless charging mobile phone terminal. When the mobile phone is placed on the wireless charging base, the coil can be coupled with a coil on the charging base to charge the mobile phone.

Figure 22:
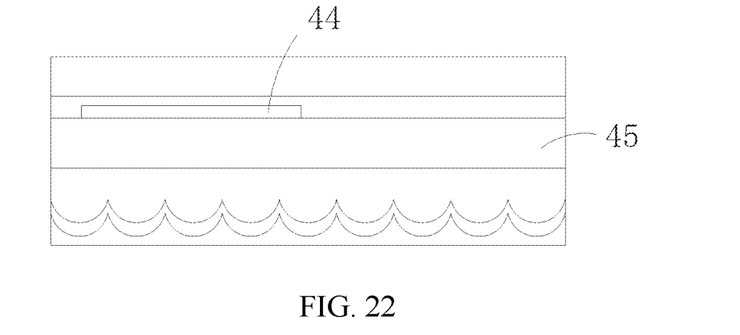
FIG. 22 is another schematic cross-sectional view of an electronic device rear cover module shown in FIG. 21.

Preferably, with reference to FIG. 22, the functional layer 44 is provided on the carrier layer 45. The functional layer 44 achieves functions such as wireless charging, NFC, display, and light emission. For example, the functional layer 44 includes an OLED module, which includes a cathode, an anode, and an organic material between the cathode and the anode. The OLED module can achieve light emission or display, such as caller identification, information reminder, etc.

Figure 23:
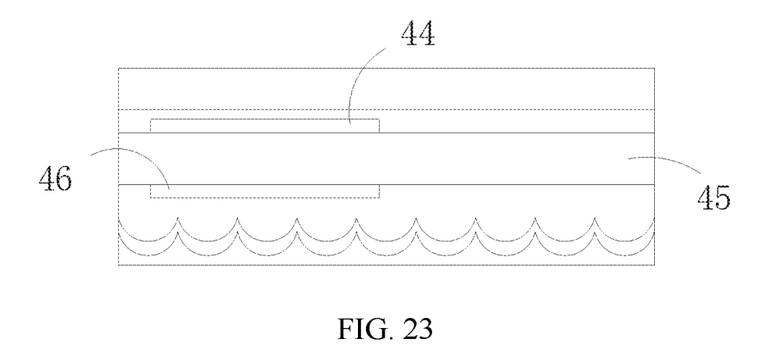
FIG. 23 is another schematic cross-sectional view of an electronic device rear cover module shown in FIG. 21.

Preferably, with reference to FIG. 23, the electronic device rear cover module 400 further includes a graphic layer 46 arranged at the carrier layer. The graphic layer 46 and the functional layer 44 may be respectively arranged at two sides of the carrier layer 45, and their locations may be interchanged; or they may be both arranged at one side of the carrier layer 45. The graphic layer 46 can highlight the functional area or indicate the functional area. It is also possible that highlight display is achieved by a predetermined logo and through light emission of the functional layer. By bypassing or penetrating the rear cover module, the OLED module can be connected to the battery and other components by bypassing or penetrating through a border, a camera hole, a graphic layer, etc.

Therefore, the electronic device rear cover meets personalized requirements by providing colors or graphics and text in the appearance layer in cooperation with the micro-nano layer to achieve a special optical effect, while integrating the functional layer. In this way, the electronic device rear cover is not only a structural component, but also has more market values.

In order to make the purpose, features and advantages of the present application clearer, specific implementations of the present application have been described in details above with reference to the accompanying drawings. In the above description, various specific details are set forth in order to better illustrate the present application. However, the present application can be implemented in many other ways different from those described above, and those skilled in the art can make similar improvements without violating the connotation of the present application. Therefore, the present application is not limited by these specific embodiments disclosed above. Moreover, the technical features of the above-mentioned embodiments can be combined arbitrarily. In order to make the description concise, not all possible combinations of the various technical features in the above-mentioned embodiments have been described. However, as long as a combination of these technical features does not lead to contradiction, this combination shall be considered within a scope of this specification.

The embodiments described above merely describe several implementation manners of the present application, and the description thereof is specific and detailed, but shall not be understood as a limitation to a patent scope of the present application. It should be noted that for those skilled in the art, without departing from a concept of the present application, can make several modifications and improvements, and all these modifications and improvements shall fall within a protection scope of the present application. Therefore, the scope of the present application shall be determined by the appended claims.

What is claimed is:

1. A decorative functional film, comprising:
   a micro-nano layer comprising a plurality of convex micro-nano structures and/or a plurality of concave micro-nano structures;
   a reflective layer covering the micro-nano layer;
   a coloring layer covering the reflective layer; and
   a functional layer comprising an electrical conductive layer, the electrical layer comprising at least one leading wire and configured for carrying out electrical connections with internal components through the at least one leading wire,
   wherein the coloring layer is coated with a UV resin configured to form grooves, and electrical conductive materials are filled in the grooves of the coloring layer to form the electrical conductive layer, and
   wherein the functional layer further comprises an insulation protective layer covering the electrical conductive layer, the electrical conductive layer further comprises a contact portion for electrically contacting with external circuits, and the contact portion is not covered by the insulation protective layer.

2. The decorative functional film according to claim 1, further comprising a carrier layer, wherein the micro-nano layer is provided on the carrier layer, and the functional layer is provided on the coloring layer or the carrier layer.

3. The decorative functional film according to claim 1, wherein the electrical conductive layer comprises an electrical conductive solid line or an electrical conductive grid.

4. The decorative functional film according to claim 3, wherein the electrical conductive solid line or the electrical conductive grid is colorless and transparent.

5. The decorative functional film according to claim 1, wherein the functional layer comprises at least one of an antenna module, a display module, a touch module, a wireless charging module, an NFC module, or a light-emitting module.

6. The decorative functional film according to claim 5, wherein the display module comprises at least one of an OLED display layer, an LED display layer, or a liquid crystal display layer.

7. The decorative functional film according to claim 2, wherein the decorative functional film further comprises a colored layer, or the carrier layer is a colored PET layer.

8. The decorative functional film according to claim 2, further comprising a second micro-nano layer located at any side of the carrier layer, wherein the micro-nano layer and the second micro-nano layer individually exhibit an optical effect, or the micro-nano layer and the second micro-nano layer interfere with each other to exhibit an optical effect.

9. The decorative functional film according to claim 2, further comprising a graphic layer located at any side of the carrier layer, wherein the graphic layer is adapted to the micro-nano layer to imaging and/or the graphic layer corresponds to the functional layer.

10. The decorative functional film according to claim 1, wherein the micro-nano structures are linear cylindrical lenses, non-linear cylindrical lenses, micro lenses, small short lines, Fresnel lenses, drawing lines, CD patterns, or a combination thereof.

11. An electronic device rear cover module, comprising the decorative functional film according to claim 1.

12. A decorative functional film, comprising:
- a micro-nano layer comprising a plurality of convex micro-nano structures and/or a plurality of concave micro-nano structures;
- a reflective layer covering the micro-nano layer;
- a coloring layer covering the reflective layer; and
- a functional layer comprising an electrical conductive layer, the electrical layer comprising at least one leading wire and configured for carrying out electrical connections with internal components through the at least one leading wire,
- wherein the coloring layer is coated with a UV resin configured to form grooves, and electrical conductive materials are filled in the grooves of the coloring layer to form the electrical conductive layer, and
- the electrical conductive layer comprises an electrical conductive solid line or an electrical conductive grid, the electrical conductive solid line or the electrical conductive grid having at least one further leading wire extending to a side of the coloring layer facing away from the reflective layer through a perforated hole.

13. The decorative functional film according to claim 8, wherein the second micro-nano layer includes a plurality of convex second micro-nano structures presented as a plurality of cylindrical lenses arranged with spaces therebetween.

14. The decorative functional film according to claim 1, further comprising an adhesive layer carrying a release film for facilitating transportation.

* * * * *